United States Patent [19]

Wyczalek et al.

[11] Patent Number: 4,745,890
[45] Date of Patent: May 24, 1988

[54] ENGINE WITH FLUIDIC VARIABLE SWIRL PORT

[75] Inventors: Floyd A. Wyczalek, Birmingham, Mich.; Patrick A. Ferguson, High Point, N.C.

[73] Assignee: General Motors Corporation, Detroit, Mich.

[21] Appl. No.: 914,082

[22] Filed: Oct. 1, 1986

[51] Int. Cl.⁴ .............................. F01L 3/00
[52] U.S. Cl. .................... 123/188 M; 123/306; 123/193 H
[58] Field of Search ............. 123/188 M, 306, 308, 123/281, 263, 193 H

[56] References Cited

U.S. PATENT DOCUMENTS

| 1,993,155 | 3/1935 | Faber, Jr. | 123/188 M |
| 3,410,291 | 11/1968 | Boothe et al. | 137/81.5 |
| 3,849,086 | 11/1974 | Johnson | 48/189.1 |
| 3,890,949 | 6/1975 | Elsbett et al. | 123/188 M |
| 4,000,722 | 1/1977 | May | 123/281 |
| 4,294,207 | 10/1981 | May | 123/279 |
| 4,351,294 | 9/1982 | Giddings | 123/291 |
| 4,549,574 | 10/1985 | Taylor | 137/565 |
| 4,574,751 | 3/1986 | Sugiyama et al. | 123/188 M |
| 4,606,308 | 8/1986 | Furlong | 123/193 H |
| 4,628,880 | 12/1986 | Aoyama et al. | 123/188 M |

Primary Examiner—E. Rollins Cross
Attorney, Agent, or Firm—Robert J. Outland

[57] ABSTRACT

A fluidic variable swirl port for an internal combustion engine includes a curved entry chamber centered on the valve axis with an inlet duct extending from one side. A small control port opens laterally into one or both sides of the inlet duct through which air or exhaust gas may be admitted to offset the path of the main inlet flow stream and generate swirl in the connecting engine cylinder when the control port is open while allowing free flow at higher flow rates when the control port is closed. Alternate embodiments and an engine operating system are also disclosed.

10 Claims, 3 Drawing Sheets

ENGINE WITH FLUIDIC VARIABLE SWIRL PORT

TECHNICAL FIELD

This invention relates to internal combustion engines and more particularly to controllable variable swirl intake ports in and for such engines.

BACKGROUND

It is known in the art relating to internal combustion engines having cylinders with poppet intake valves to provide intake ports of a straight non-swirl type. Alternatively, there may be provided so called "swirl ports" in which the configuration of the passage defined by an intake port causes a significant degree of swirl to be generated in the charge flow entering the cylinder past the intake valve. In some instances, divided flow intake ports have been proposed in which movable valves or vanes vary the flow path within the port and control the amount of swirl generated by the port during the cylinder intake stroke.

In general such variable swirl ports require the provision of mechanical actuating devices within the port. These may involve complicated controls or actuating systems which interfere to some extent with free flow through the port under unthrottled conditions when swirl may not be required. Likewise, non-adjustable swirl ports, in general, are configured in a manner that interferes with the free breathing or maximum flow of the ports under conditions where swirl is not required in the engine cylinders.

The prior art pertaining to fluid flow in general also includes so called fluidic valves or control devices in which the rate of flow through a passage is varied by the use of a lateral control port which deflects the natural direction of flow of fluid into a swirling pattern in a vortex chamber. This is conventionally used to control the rate or direction of flow of a main fluid stream through the application of a smaller control stream, or pressure, of fluid from an external source. It is believed that the application of this technology to the control of fluid flow in engine intake ports has not been previously proposed or its capabilities appreciated.

SUMMARY OF THE INVENTION

The present invention provides a fluidic variable swirl intake port for internal combustion engines.

In such ports, an open entry chamber surrounding each intake valve axis is connected with an essentially straight sided inlet duct tangentially joining the entry chamber to provide unrestricted flow therethrough. The inlet duct is intersected upstream by a laterally directed control port through which control fluid may be supplied laterally to the direction of intake flow in the inlet duct.

The concept provides an open free flowing inlet port for high flow conditions, where cylinder swirl is not required, and takes advantage of the application of control fluid during lower flow conditions to deflect the main stream to one side of the inlet duct, thereby generating swirl at the cylinder inlet.

In another aspect of the invention, the control fluid may be one or a combination of selected available fluids, such as recirculated exhaust gas, recirculated crankcase vapors and supplemental air. When used in an engine with throttled intake, the vacuum developed in the intake port and induction system by throttling the inlet during operating conditions of lower speed and/or power may be used to vary the inflow of control fluid as an inverse function of the main charge flow and so provide high swirl near closed throttle conditions and little or no swirl at open throttle conditions where free breathing and unrestricted flow are desired and swirl is not likely to be beneficial.

These and other features and advantages of the invention will be more fully understood from the following description of certain specific embodiments of the invention taken together with the accompanying drawings.

BRIEF DRAWING DESCRIPTION

DETAILED DESCRIPTION—THE PRIOR ART

Figure 1:
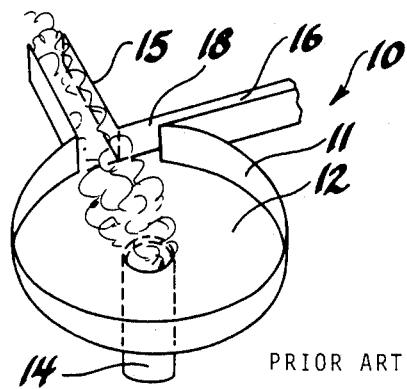
FIG. 1 is a pictorial view of a prior art vortex fluid amplifier operating in the maximum flow condition.
Figure 2:
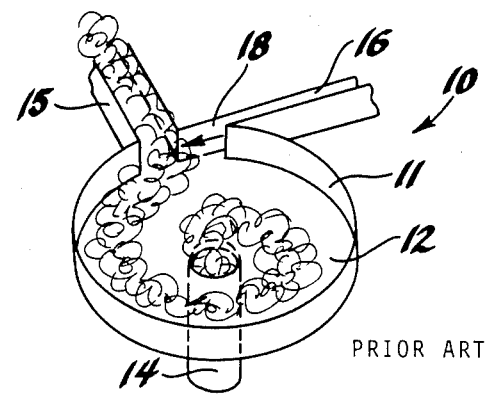
FIG. 2 is a pictorial view similar to FIG. 1 showing the fluid amplifier operating in a controlled restricted flow condition.

Referring first to FIGS. 1 and 2 of the drawings, there is shown a prior art vortex fluid amplifier generally indicated by numeral 10. The amplifier includes means defining a disc-like circular vortex chamber 11 having a flat floor 12 with a centrally located outlet conduit 14 extending axially from the center of the floor 12. At a point on the edge of the vortex chamber, an inlet conduit 15 connects radially with the periphery of the chamber so as to direct a flow of entering fluid toward the entrance to the center outlet conduit 14.

Adjacent to the opening of the inlet conduit 15 into the vortex chamber, a control conduit 16 intersects the vortex chamber 10 tangentially at substantially right angles to the inlet conduit 15 and directed across the opening of the inlet conduit into the vortex chamber. Although not shown, the opening 18 of the control conduit into the vortex chamber may be restricted to form a nozzle so as to accelerate the flow of pressurized control fluid as it enters the vortex chamber.

In operation, as shown in FIG. 1, maximum fluid flow through the fluid amplifier is obtained when no fluid flow enters the chamber through the control conduit. Then the flow of fluid through the main inlet conduit 15 is directed radially toward the outlet conduit 14 and free and open flow of the inlet fluid through the vortex chamber is allowed.

As illustrated in FIG. 2, the flow of inlet fluid is restricted by the entry of control fluid through the control conduit 16 tangentially into the vortex chamber, where it impinges upon the entering main flow of inlet fluid through the inlet conduit 15. This impingement diverts the main inlet flow into a swirl pattern or vortex within the vortex chamber, so that the combined flow passes through a more or less spiral path in its approach to the outlet conduit 14. This action, it is recognized in the prior art, restricts the rate of flow of the intake fluid by introducing a restrictive diversionary flow into the flow path of fluid from the inlet conduit to the outlet conduit.

Figure 3:
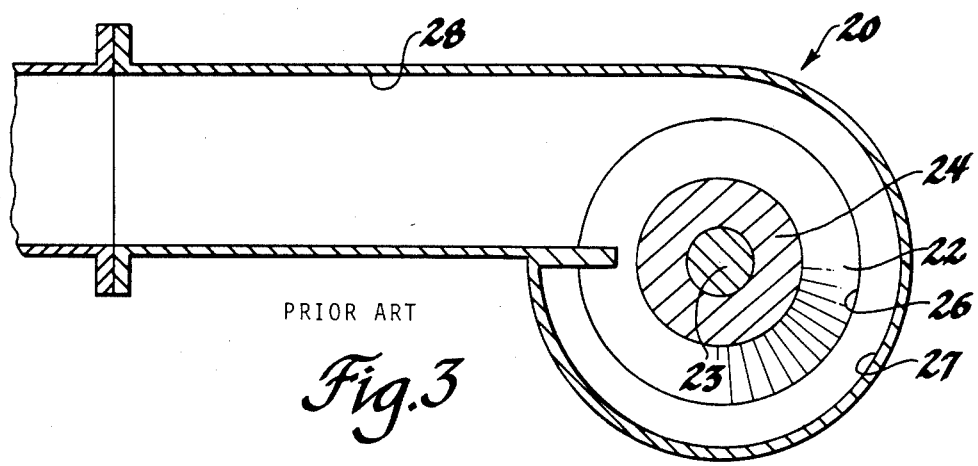
FIG. 3 is a cross-sectional top view of a swirl type engine intake port exemplary of the prior art.

Referring now to FIG. 3, there is shown a schematic representation of a swirl intake port for an internal combustion engine, the port being generally indicated by numeral 20. This prior art inlet port includes an intake valve 22 having a stem 23 reciprocably received in a valve guide 24. The valve contacts a valve seat, not shown, toward which flow is directed through a throat 26 from an upstream swirl chamber 27. An inlet passage or duct 28, having a width approximately half that of the diameter of the swirl chamber, intersects the swirl chamber 27 tangentially to direct entering fluid into one side thereof.

In operation, flow into the intake port through the duct 28 enters one side of the swirl chamber 27 and passes in a circumferential direction around the swirl chamber while exiting the port through the throat 26 and past the open valve 22. The outlet flow then enters the cylinder of an associated engine, or the corresponding chamber of a flow test device when tested therein, in a swirling motion. While the swirl generating capability of such a port is well known, it is also recognized that the delivery of the intake air flow to only one side of the chamber 27 results in a restriction of flow which interferes with free breathing of an engine utilizing such a port under wide open throttle conditions, especially at maximum speeds.

THE INVENTION

Figure 4:
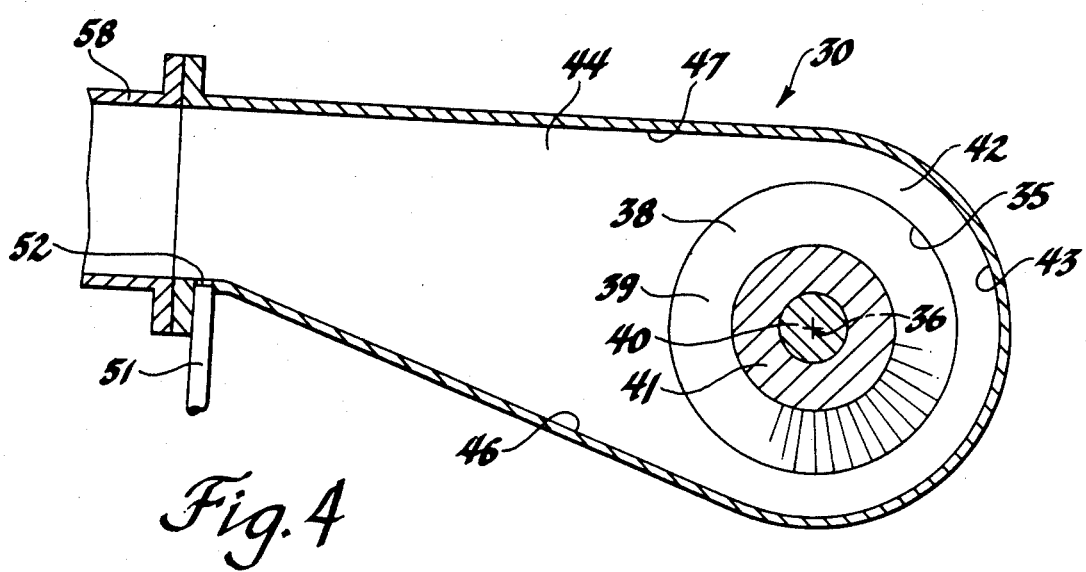
FIG. 4 is a cross-sectional top view of a comparable embodiment of fluidic variable swirl intake port formed in accordance with the present invention.
Figure 5:
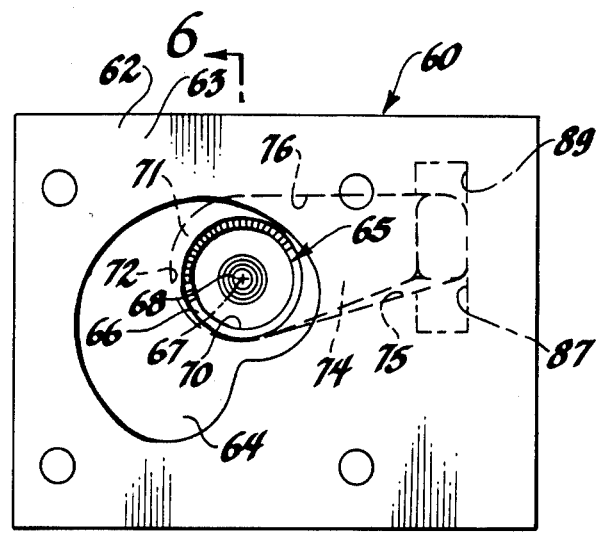
FIG. 5 is a bottom view of a flow box model of an alternative embodiment of combustion chamber and fluidic variable flow intake port according to the invention.
Figure 6:
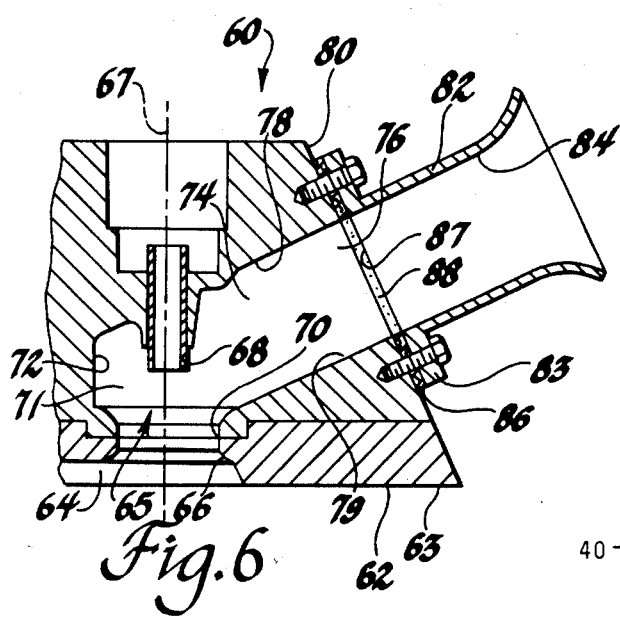
FIG. 6 is a longitudinal cross-sectional view of the port taken in the plane indicated by the line 6—6 of FIG. 5.

Referring now to FIGS. 4-6 there is schematically shown a free breathing variable swirl fluidic intake port formed in accordance with the principles of the present invention and generally indicated by numeral 30. The internal configuration of the port illustrated is representative of those which would be incorporated in the cylinder head or other cylinder defining body of an internal combustion engine for delivery of intake air or fluid to an engine cylinder. However, the configuration would normally first be incorporated in a flow model of the port for testing in flow box device commonly used to determine the comparative flow characteristics of intake port configurations for engines.

The port 30 terminates at an associated engine cylinder in a valve seat, not shown. The interior of the port 30 is defined by a circular throat 35 adjacent the valve seat and centered on the axis 36 of a valve 38 having a head 39 seated on the valve seat when the valve is closed and movable away from the valve seat to permit opening of the port to fluid inlet flow.

The valve 38 further includes a stem 40 that is reciprocably received within a valve guide 41 carried in a portion of an associated engine cylinder head or the like and extending downwardly into the interior of the port, part way toward the valve head. Optionally, if desired the valve guide 41 may be cut off at a higher level or recessed into the port wall so that it does not directly affect flow within the port itself.

Upstream of the throat 35 on the side thereof opposite from the valve seat, the inlet port includes an entry chamber 42 surrounding the valve axis. Chamber 42 is configured, in a plane normal to the axis, to be open along an inlet side and defined along the remaining sides by a curved wall 43. The wall 43 is approximately centered near the valve axis, although it may be offset therefrom if desired so long as the entry chamber provides a substantial volume at all points surrounding the axis from which may emanate flow through the valve throat 35.

On the open side of the entry chamber, the intake port extends upstream with an inlet duct 44 which extends laterally at a substantial angle, not shown, from the valve axis. Duct 44 includes generally straight side walls 46, 47 extending tangent to the edges of the curved wall 43 defining the edges of the entry chamber. The sides 46, 47 are interconnected upwardly by a roof portion, not shown, and downwardly by a floor portion, not shown, generally parallel to the roof portion.

The duct 44 must approach the valve axis at a substantial angle therewith. However, it should be understood that the angular relationship of the inlet duct with the valve axis may be varied substantially from a horizontal position at right angles with the valve axis up to a considerably higher slope as long as the angular relation from the valve axis represents a substantial angle, at least in excess of about 30 degrees.

At a substantial distance from the valve axis along the inlet duct, there is provided an elongated control port 51 having a height preferably substantially equal to the height of the inlet duct and a width along the direction of flow through the duct which is relatively narrow, forming a generally rectangular opening 52 in the side wall 46. In an engine the control port 51 might be formed by an opening in an insert, such as a gasket or other member between the cylinder head and an associated intake manifold. Optionally, however, the control port or ports could be cast within the cylinder head or as a part of the associated manifold at a point a substantial distance upstream of the valve axis in the intake port.

Beyond the control port, the inlet passage is continued by a connecting member, such as a manifold, or an extension 58 of the inlet duct 44 which generally continues in the direction and configuration of the walls for a short distance to provide smooth entry to intake flows.

In operation, the drawing of intake air through the intake port 30 with the valve in an open position is free and directed into all portions of the entry chamber and the valve throat as long as there is no flow of control fluid through the control port 51 into the intake port 30. In this condition, free breathing is provided with a high flow of air or intake charge through the port .

When the control port 51 is opened, a control pressure may be applied to the control port causing a flow of control fluid, such as air or recirculated exhaust gas, through the control port 51, in a lateral direction at essentially right angles to the flow of fluid within the port. Alternatively, when a substantial vacuum is developed within the port by upstream throttling of the main inlet flow stream, an adequate flow of control fluid through the control port 51 may be caused merely by opening the port 51.

In either case, the impingement of the control fluid against the mass of intake air or charge flowing through the inlet duct urges the major portion of the intake flow toward the opposite wall 47, away from the control port. This action, then, causes the major portion of the intake flow to enter the entry chamber 42 primarily to one side thereof, between the valve stem 40 and the side wall 47, causing the major portion of the flow to be turned in the same direction by the curved wall 43 around the valve axis. This forms a vortex-like swirling flow which continues as the intake flow passes through the valve throat and out past the valve and valve seat to the engine cylinder.

The degree of swirl provided may be to some extent controlled by the mass and rate of flow of the control stream introduced through the control port 51. For this purpose it is possible to suitably define the width of the opening 52 to form a suitable nozzle to control, in conjunction with the pressure differential across the control port, the rate of flow and the mass of flow of control fluid introduced to the intake port during each intake stroke of an associated engine in which the port arrangement might be installed.

FIGS. 5 and 6 of the drawings illustrate the configuration of one form of the invention incorporated in a flow model generally indicated by numeral 60 and representing a portion of an engine cylinder head, or the like. The model 60 includes an outlet wall 62 having a flat lower surface 63 with a recess 64 representing the upper surface of an engine combustion chamber.

Within the flow model 60 is a fluidic variable flow intake port 65 generally similar to the port 30 of FIG. 4 previously described and including a valve seat 66, poppet valve with head and stem (not shown), axis 67, valve guide 68, throat 70, entry chamber 71, curved wall 72, inlet duct 74, side walls 75, 76, roof portion 78 and floor portion 79.

These elements are generally similar in configuration and operation to the corresponding elements of FIG. 4. However, one difference is that the curved wall 72 defining the entry chamber 71 is centered at a point slightly offset laterally from the valve axis 67. Thus, the curved wall 72 approaches tangency with the throat 70 (as viewed along the valve axis in FIG. 5) at a point on the circumference near the intersection with the side wall 75. On the opposite side where the side wall 76 connects, the curved wall 72 is offset outwardly from the adjacent edge of the throat 70. Thus, it is seen that the entry chamber center is offset slightly from the valve axis toward the side 76 of the inlet duct 74 so that the configuration of the intake port 65 inherently provides a certain amount of swirl prior to the introduction of any control fluid from a control port.

The flow model also has an outer wall 80 through which the inlet duct 74 opens. A bellmouthed extension member 82 is secured to this wall 80 by a flange 83 and provides a duct extension 84 that may simulate the intake manifold runner in an engine installation. Between the flange 83 and the wall 80, there is an insert 86, which may also be a gasket. The insert has a cutout section on one side that defines a control port 87 having a rectangular opening 88 through the duct wall 75. The control port thus extends laterally of the flow direction in the inlet duct 74 and essentially at a right angle (normal) thereto. Optionally, a second control port 89 may be added opening laterally through the side wall 76 directly opposite the port 87.

The operation of the embodiment of FIGS. 5 and 6 is essentially like that of FIG. 4 in that relatively free flow of intake air or charge mixture is allowed when the control port 87 is closed and increased swirl with reduced flow result when the control port is open. Since this port configuration inherently develops moderate swirl when in the free flowing condition (without control port flow), opening of the optional control port 89 (with the other port 87 closed) actually resulted in a reduction of swirl in engine simulating flow box testing and the total mass flow through the port was also reduced.

Figure 7:
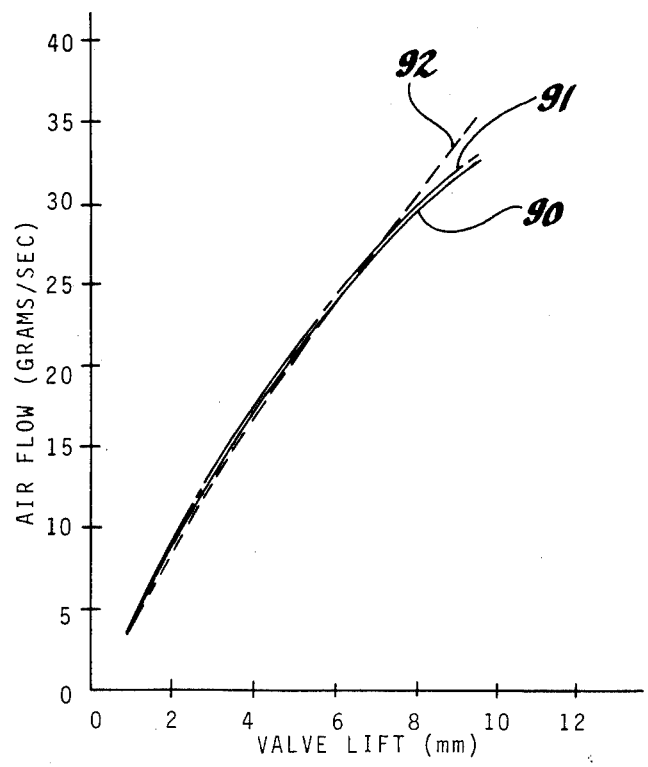
FIGS. 7, 8 and 9 are graphical presentations of test results from tests of inlet ports in accordance with the invention.
Figure 8:
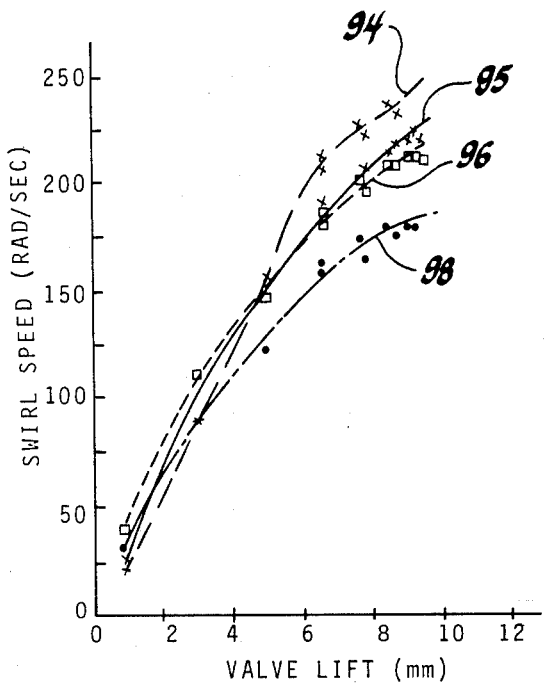
Figure 9:
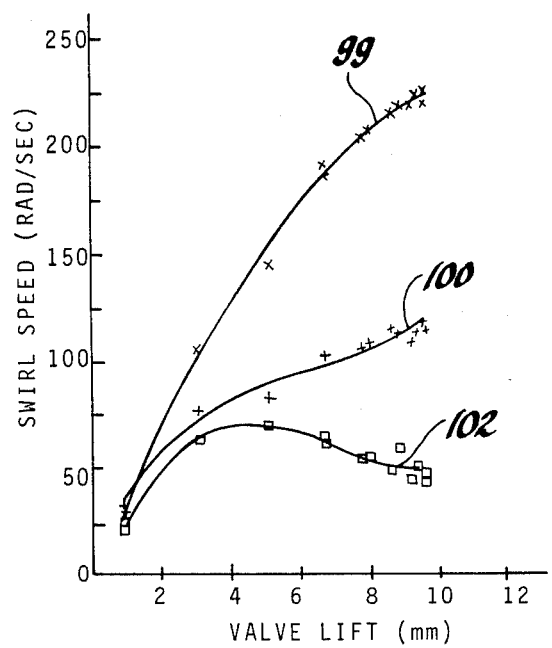

Referring now to FIGS. 7-9 of the drawings, there are graphically presented results of flow box testing of a fluidic variable swirl port according to the invention and somewhat similar to FIGS. 5 and 6 as compared with a prior art fixed swirl port of the type illustrated in FIG. 3.

FIG. 7 shows port air flow versus valve lift under similar operating conditions wherein the solid line 90 represents the flow output of the prior art swirl port, the unequal-dash line 91 represents the variable swirl port in the condition of high swirl with the control port open and the equal-dash line 92 represents the variable swirl port in the low swirl condition with the control port closed. It is noted that the air flow through the prior art swirl port and the variable swirl port according to the invention are essentially equal when the variable swirl port is operating in the high swirl condition. When the control port is closed, the amount of air flow through the variable flow port is increased approximately 7 percent at maximum valve lift over the swirl condition of the variable port and the prior art swirl port.

FIG. 8 compares the swirl speed reached by various port configurations. The long-dash line 94 shows the swirl effectiveness of the prior art swirl port of FIG. 3. The solid line 95, the short-dash line 96 and the unequal-dash line 98 illustrate the swirl effectiveness of similar variable swirl port configurations with control ports having differing nozzle configuration, all operating in the open condition for maximum swirl flow. Here it is noted that while the swirl effectiveness of the prior art port is greater than the others, the variable swirl ports can also be made by practical development and testing to approach the swirl speeds reached by the prior art swirl port.

FIG. 9 illustrates the manner in which the the swirl may be varied by a swirl port similar to FIGS. 5 and 6 with the optional second control port added. In this FIG. 9, the upper line 99 shows the amount of swirl reached with the tangent side swirl port 87 open to create a maximum amount of swirl. The intermediate line 100 shows the reduced amount of swirl obtained when both control ports are closed and the lower line 102 illustrates the further reduced amount of swirl resulting when the optional control port 89 on the stepped side 76 is opened to obtain a further suppression of swirl. In these tests it was noted that the highest air flow still resulted from the condition with both control ports closed even though the intermediate swirl speed indicated by line 100 was reached. The flow volume was reduced when either control port was opened even though the swirl speed was increased in one case and reduced in the other.

Figure 10:
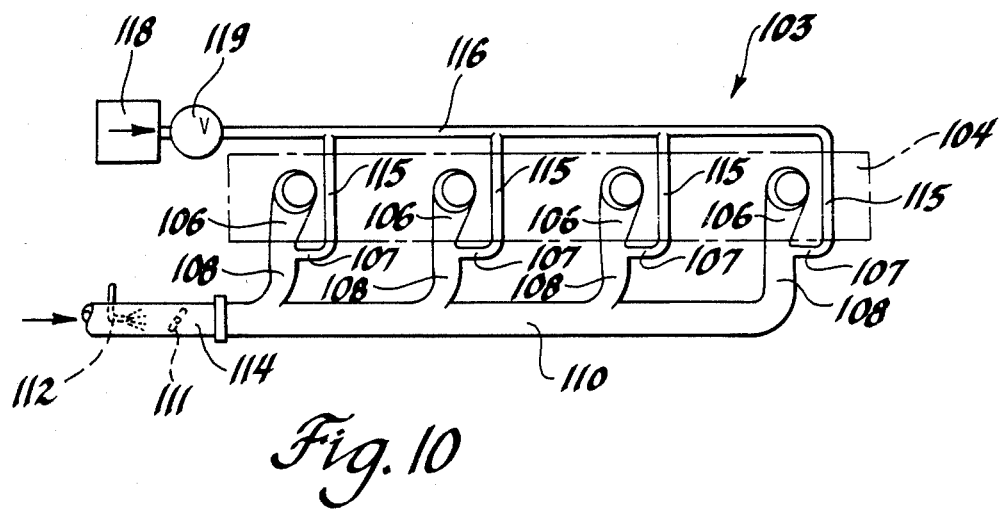
FIG. 10 is a schematic top view of an engine having an induction system with fluidic variable swirl intake ports in accordance with the invention.

Referring to FIG. 10, there is shown schematically an internal combustion engine 103 having four inline cylinders, not shown, closed conventionally by a single cylinder head 104. At each cylinder location, the cylinder head 104 has a fluidic variable swirl intake port 106 similar to the port of FIGS. 5 and 6 but having only a single control port 107.

Each intake port 106 has its inlet duct connected with a branch or leg 108 of a log type intake manifold 110. A throttle 111 and fuel injection means 112 are optionally provided in a throttle body 114 connected with the upstream end of the manifold 110.

Each control port 107 is connected with a branch 115 of a control manifold 116. On its inlet end, the manifold 116 is connected with one or more sources 118 of control fluids, such as recirculated exhaust gas, recirculated crankcase vapor and supplemental air. A shutoff valve 119 may be provided to cut off the flow of control fluid when desired. The control fluid may be supplied at its ambient pressure or, if desired, a pump or other means, not shown, may be provided to pressurize and/or control the mass flow of control fluid to the control ports.

In operation, of the engine of FIG. 10, cylinder charges of air-fuel mixture are delivered from the intake manifold 110 through the intake ports 106 on the intake strokes of the pistons in the respective cylinders. When the throttle 111 is partly closed during low load operation, a substantial vacuum is created within the intake ports and the mass of mixture flow is reduced by the restriction of the throttle. This draws in a flow of control fluid through the open control ports 107, causing swirl in the intake charges delivered to the engine cylinders.

When the throttle is nearly or fully opened, the manifold vacuum is greatly reduced, lowering the pressure differential so that little or no control fluid is drawn in through the control ports. Thus, the cylinder charges are delivered with a reduced amount of swirl (or none depending on the port and combustion chamber configurations) and free breathing full flow of cylinder charges through the ports 106 is obtained.

If, for example, the control manifold is connected with the engine exhaust system for recirculation of exhaust gas (EGR), the variation of EGR control fluid flow caused by normal throttling of the intake manifold may be sufficient for normal operating purposes. At idle, closing of the shutoff valve 119 may be required to avoid dilution of the idle charge with exhaust gas. Possibly this may be accomplished by a valve or control means already provided in the engine EGR control system. Obviously, many other variations could be made in the manner of and means for operating an engine with fluidic variable swirl intake ports in accordance with the invention.

While the invention has been described by reference to certain selected embodiments, it should be understood that numerous changes could be made within the spirit and scope of the inventive concepts disclosed. Accordingly it is intended that the invention not be limited to the described embodiments, but that it have the full scope permitted by the language of the following claims.

The embodiments of the invention in which an exclusive property or privilege is claimed are defined as follows:

1. A fluidic variable swirl intake port for an internal combustion engine, said port comprising
    a circular throat centered on a valve axis and terminating along the axis in an annular valve seat,
    an entry chamber surrounding the valve axis on the other side of the throat from the valve seat, said chamber being open along one side in a plane normal to said axis and having the remaining sides defined by a curved wall extending around the axis and providing substantial volume surrounding the axis for flow through the throat,
    an inlet duct extending from the open side of the entry chamber at a substantial angle laterally from the valve axis, said duct having generally straight sides of limited maximum curvature extending essentially tangent to the entry chamber defining curved wall, and generally parallel roof and floor portions connecting the sides, and
    a control port opening to the inlet duct through one of the sides at a substantial distance from the valve axis for the delivery of control fluid into the port laterally to the direction of inlet flow through the duct to urge the entering flow toward one side of the duct and the entry chamber, thereby creating substantial swirl in the fluid flow entering the valve throat and passing by the valve seat.

2. An intake port as defined in claim 1 wherein
    the throat and valve seat are offset to one side of the entry chamber as viewed along the axis and said sides of the inlet duct tangentially intersect the entry chamber curved wall at essentially opposite points near the maximum and minimum locations of throat offset so that one of the sides lies substantially closer than the other to tangency with the throat as viewed along the axis, and
    the control port opens through the inlet duct side which intersects the entry chamber curved wall on the side toward which the throat is offset and is thus closest to tangency with the throat.

3. An intake port as defined in claim 2 and further comprising
    a second control port opening to the inlet duct through the side which intersects the entry chamber curved wall on the side away from which the throat is offset and is thus farthest from tangency with the throat.

4. An intake port as defined in claim 3 wherein the second control port is essentially opposite from the first control port.

5. A fluidic variable swirl intake port for an internal combustion engine, said port comprising
    a circular throat centered on a valve axis and terminating along the axis in an annular valve seat,
    an entry chamber surrounding the valve axis on the other side of the throat from the valve seat, said chamber being open along one side in a plane normal to said axis and having the remaining sides defined by a curved wall approximately centered near the axis and providing substantial volume surrounding the axis for flow through the throat,
    an inlet duct extending from the open side of the entry chamber at a substantial angle laterally from the valve axis, said duct having generally straight side walls extending tangent to the entry chamber defining curved wall and generally parallel roof and floor portions connecting the side walls, and
    a control port extending to the inlet duct through one of the side walls at a predetermined substantial distance from the valve axis for the delivery of control fluid into the port laterally to the direction of inlet flow through the duct to urge the entering flow toward one side of the duct and the entry chamber, thereby creating substantial swirl in the fluid flow entering the valve throat and passing by the valve seat.

6. A combination in an internal combustion engine of a fluidic variable swirl intake port having a valve axis and a control port opening through a side of the port at a substantial distance from the valve axis wherein entry of small amounts of control fluid into the intake port through the control port is effective to deflect the main charge flow through the intake port and create swirl of incoming charges entering an associated engine cylinder, an inlet duct connected with the intake port for conducting incoming charges thereto, said inlet duct including a throttle adjustable to vary the mass flow of incoming charges to the port, the moving of said throttle toward a closed position causing increasing vacuum in the intake port, and conduit means connected with the control port for conducting control fluid through the side of the intake port, the mass of control fluid delivered being variable at least in part as a function of the level of vacuum existing in the intake port, whereby control fluid flow increases as the throttle is closed so that, as the mass of incoming charges is reduced, the cylinder swirl is correspondingly increased.

7. A combination as in claim 6 wherein the conduit means connects upstream with a source of engine exhaust gas for recirculation of a portion thereof to the engine cylinder.

8. A combination as in claim 6 wherein the conduit means connects upstream with a source of engine crankcase vapors for recirculation of a portion thereof to the engine cylinder.

9. A combination as in claim 6 wherein the conduit means connects upstream with a source of supplemental air for delivery of a portion thereof to the engine cylinder.

10. A combination as in claim 6 wherein said intake port comprises a circular throat centered on the valve axis and terminating along the axis in an annular valve seat, an entry chamber surrounding the valve axis on the other side of the throat from the valve seat, said chamber being open along one side in a plane normal to said axis and having the remaining sides defined by a curved wall extending around the axis and providing substantial volume surrounding the axis for flow through the throat, an inlet duct extending from the open side of the entry chamber at a substantial angle laterally from the valve axis, said duct having generally straight sides of limited maximum curvature extending essentially tangent to the entry chamber defining curved wall, and generally parallel roof and floor portions connecting the sides, and said control port opening to the inlet duct through one of the sides at a predetermined substantial distance from the valve axis for the delivery of control fluid into the port laterally to the direction of inlet flow through the duct to urge the entering flow toward one side of the duct and the entry chamber, thereby creating substantial swirl in the fluid flow entering the valve throat and passing by the valve seat.

* * * * *